United States Patent
Fick et al.

(10) Patent No.: US 9,205,366 B2
(45) Date of Patent: Dec. 8, 2015

(54) METHOD FOR PRODUCING A FILTER FOR THE ADSORPTION OF VOLATILE HYDROCARBONS

(71) Applicant: HELSATECH GMBH, Gefrees (DE)

(72) Inventors: Peter Fick, Bayreuth (DE); Rainer Ernst, Bindlach (DE); Jessica Schneider, Bad Berneck (DE); Jörg Weber, Hof (DE)

(73) Assignee: HELSATECH GMBH, Gefrees (DE)

( * ) Notice: Subject to any disclaimer, the term of this patent is extended or adjusted under 35 U.S.C. 154(b) by 0 days.

(21) Appl. No.: 14/426,529

(22) PCT Filed: Sep. 6, 2013

(86) PCT No.: PCT/EP2013/068509
§ 371 (c)(1),
(2) Date: Mar. 6, 2015

(87) PCT Pub. No.: WO2014/037525
PCT Pub. Date: Mar. 13, 2014

(65) Prior Publication Data
US 2015/0209715 A1    Jul. 30, 2015

(30) Foreign Application Priority Data
Sep. 7, 2012  (DE) .......................... 10 2012 215 939

(51) Int. Cl.
*B01D 53/04* (2006.01)
*B01D 39/16* (2006.01)
(Continued)

(52) U.S. Cl.
CPC .............. *B01D 53/04* (2013.01); *B01D 39/163* (2013.01); *B01D 67/0002* (2013.01);
(Continued)

(58) Field of Classification Search
CPC ................. B01D 2239/0407; B01D 2239/083; B01D 2239/086; B01D 2239/10; B01D 2253/202; B01D 2257/708; B01D 39/163; B01D 53/04; B01D 67/0002; B01D 69/12; B01D 71/48
See application file for complete search history.

(56) References Cited

U.S. PATENT DOCUMENTS 5,701,893 A * 12/1997 Kern .................. A41D 13/1123
128/206.19
5,759,496 A * 6/1998 Hickman ........... B01D 53/0462
422/171
(Continued)

FOREIGN PATENT DOCUMENTS

DE          697 32 032 T2    5/1999
DE    10 2004 020 555 A1   11/2005
(Continued)

OTHER PUBLICATIONS

International Search Report issued in PCT/EP2013/068509, mailed on Jan. 30, 2014.

*Primary Examiner* — Christopher P Jones
(74) *Attorney, Agent, or Firm* — Birch, Stewart, Kolasch & Birch, LLP

(57) ABSTRACT

A system (10) and method for manufacturing ophthalmic devices, in particular contact lenses or intraocular lenses, the system comprising: at least one injection molding machine for manufacturing a cup bottom part (202) and cup top part (204) to form a cast mold, a cooling station (30), an injection assembly (120) arranged for injecting an amount of monomeric material into the cup bottom part, a curing assembly (130), a first optical inspection assembly (140) for determining at least one first optical cup part parameter, a second optical inspection assembly (150) for determining at least one optical combination parameter of the combination of the cured monomeric material formed into a lens and the cup part that bears the lens, and an electronic control (14) provided with a calculation module for determining at least one optical lens parameter of the lens on the basis of the cup part parameter and the combination parameter. Possibly, production parameters can be adjusted on the basis of trend changes of the lens parameters of produced lenses.

20 Claims, 7 Drawing Sheets

Figure 1:
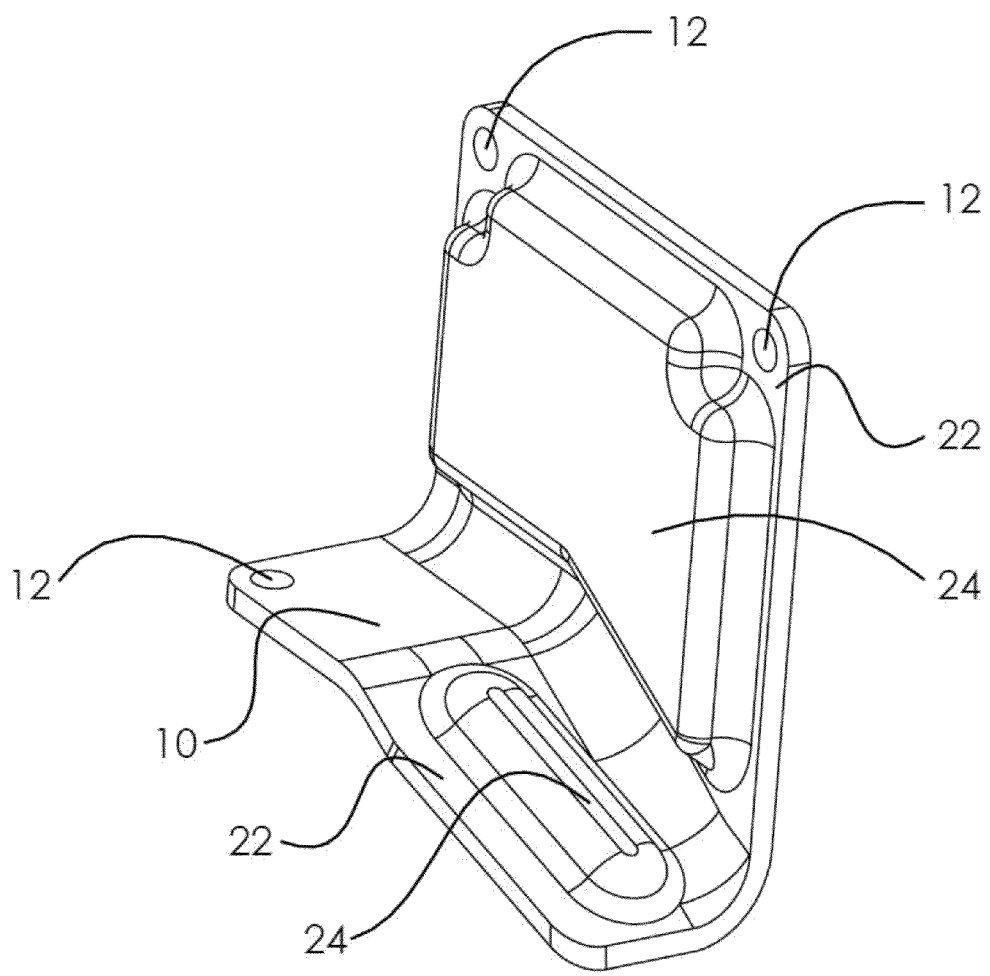

(51) Int. Cl.
  *B01D 67/00* (2006.01)
  *B01D 69/12* (2006.01)
  *B01D 71/48* (2006.01)

(52) U.S. Cl.
  CPC .............. *B01D 69/12* (2013.01); *B01D 71/48* (2013.01); *B01D 2239/0407* (2013.01); *B01D 2239/083* (2013.01); *B01D 2239/086* (2013.01); *B01D 2239/10* (2013.01); *B01D 2253/202* (2013.01); *B01D 2257/708* (2013.01)

(56) References Cited

U.S. PATENT DOCUMENTS

| | | | | |
|---|---|---|---|---|
| 5,882,517 | A * | 3/1999 | Chen | B01D 39/1615 210/496 |
| 6,660,903 | B1 * | 12/2003 | Chen | A61F 13/4707 604/378 |
| 7,145,054 | B2 * | 12/2006 | Zander | A61F 13/4756 604/380 |
| 2006/0096263 | A1 | 5/2006 | Kahlbaugh et al. | |
| 2007/0128434 | A1 | 6/2007 | Motoda et al. | |
| 2011/0094515 | A1 * | 4/2011 | Duffy | A62B 23/025 128/206.19 |

FOREIGN PATENT DOCUMENTS

| | | |
|---|---|---|
| EP | 0 917 902 A1 | 5/1999 |
| WO | 2011/133394 A1 | 10/2011 |

* cited by examiner

METHOD FOR PRODUCING A FILTER FOR THE ADSORPTION OF VOLATILE HYDROCARBONS

The invention relates to a method of producing a filter from a nonwoven fabric and to a filter thus obtained.

WO 2011/133394 A1 discloses a fibrous nonwoven fabric containing activated carbon particles and a method of producing said fabric. The fibrous nonwoven fabric may contain discrete fibers of a thermoplastic polymer, in which case the activated carbon particles are bonded to these fibers. The discrete fibers may comprise thermoplastic multi-component fibers having at least one first region having a first melting temperature and one second region having a second melting temperature. The first melting temperature is less than the second melting temperature. The multi-component fibers may be, for example, bi-component fibers, in which case a sheath of the fiber is formed by the first region and a core is surrounded by the sheath and formed by the second region.

Heating the nonwoven fabric to a temperature of at least the first melting temperature and less than the second melting temperature causes the activated carbon particles to become bonded to the nonwoven fabric in that at least a portion of the activated carbon particles becomes bonded to the at least one first region of at least a portion of the multi-component fibers while at least a portion of the discrete fibers becomes bonded together at a multiplicity of intersection points with the first region of the multi-component fibers. As the material of the first region cools down, it consolidates and thereby coheres the nonwoven fabric together without an additional binder being required for this. The activated carbon particles here thus become bonded to the multi-component fiber by melting into the surface thereof without, however, covering a significant fraction of the activated carbon particle surface with molten material of the first region. Nonetheless, this is incapable of preventing the adsorptive performance of the activated carbon particles being diminished by molten material of the first region.

The fibrous nonwoven fabric may comprise additional, differently constructed layers, for example a supporting layer and a covering layer. Subsequent processing steps may comprise an embossing operation. Embossing is usually taken to mean the act of introducing a texture or a relief into a surface of a material. This may be done using, for example, an embossing die or an embossing stamper.

The filter obtained according to the invention is designed for the adsorption of volatile hydrocarbons, for example in the engine intake tract of a motor vehicle. The nonwoven fabric comprises thermally fusionable fibers, while a binder is used to bind activated carbon particles to the surface of the fibers. The binding of the activated carbon particles may be effected using, for example, a pad mangling process and subsequent drying. It may also be effected by the nonwoven fabric being pulled through a dispersion containing activated carbon particles and binder and subsequently dried.

Filters obtained in this way are known in the prior art. They are typically fixed in a mounting frame or in a housing in order to retain them in a desired position. The shape of the mounting frame or of the housing is often not readily conformable to the desired shape at the site where the filter is to be installed, so the installation site has to be conformed to the mounting frame or to the housing in order to provide appropriate space there.

The problem addressed by the present invention is that of providing a method of producing a filter in a way which makes possible less costly and inconvenient production of the filter and better conformability to a site where the filter is to be installed while at the same time ensuring high performance characteristics on the part of the filter. A filter thus obtained shall further be provided.

The problem is solved by the features of claims 1 and 17. Appropriate embodiments of the invention will be apparent from the features of claims 2 to 16 and 18.

The invention provides a method of producing a filter for adsorbing volatile hydrocarbons from a nonwoven fabric. The nonwoven fabric comprises thermally fusionable fibers, wherein a binder is used to bind activated carbon particles to the surface of the fibers. The fibers consist of at least one thermoplastic polymer having a melting point or melting range above 200° C. The nonwoven fabric is brought into a desired shape using an embossing mold by exertion of pressure and by a temperature of at most 190° C. The process comprises a plurality of plies of the nonwoven fabric being bonded together by the exertion of the pressure and by the temperature. The nonwoven fabric is generally a textile fabric formed of fibers joined in some way into a fibrous layer and interconnected in some way without, however, regularly inter-crossed or -looped yarns being comprised, as is the case for example with a woven or knitted textile. The manner of consolidating the nonwoven fabric is also freely choosable. The nonwoven fabric may be, for example, a needled nonwoven, a spunbonded nonwoven, a random-laid nonwoven or a felt, in particular a needlefelt.

The consequence of the melting point or melting range being higher than the temperature to which the nonwoven fabric is brought is that the particular surface of the activated carbon particles—when the fibers consist exclusively of one or more thermoplastic polymers having a melting point or melting range above 200° C.—cannot be covered by molten polymer, thereby avoiding a diminished adsorptive capacity of the activated carbon particles. In this case, therefore, there is no, not even partial, melting of the particles into the polymer. The binder, by contrast, may be chosen such that it does not diminish the adsorptive capacity of the activated carbon particles to any significant degree, if at all. The temperature of at most 190° C., however, results in some softening of the polymer. This makes possible the bringing into shape and the subsequent retention of this shape after the nonwoven fabric has cooled down to below the softening temperature of the polymer. The softening further makes higher densification of the nonwoven fabric possible. The high density thus attained is retained after any cooling of the nonwoven fabric to a temperature below the softening temperature.

The shape into which the nonwoven fabric is brought is generally a three-dimensional shape, i.e., the resulting filter extends in more than one plane. The embossing mold is accordingly not an embossing mold which merely introduces texture into the surface of the nonwoven fabric, but a pressing mold which brings the filter into the three-dimensional shape similarly to a mold in drop forging.

Bonding a plurality of plies of the nonwoven fabric together provides a very high adsorptive capacity to the filter, since the activated carbon particles are separately bonded to the surface of the fibers in the individual plies of the nonwoven fabric and so altogether more activated carbon particles can be bound than in the binding of the activated carbon particles to fibers of a single nonwoven fabric equal in thickness to the overall thickness of the plurality of plies of the nonwoven fabric. This applies in particular when the individual ply of the nonwoven fabric has a blocking layer, for example in the form of a blocking nonwoven fabric, on a side facing down during coating to prevent a dispersion of the activated carbon particles and of the binder leaking out when the dispersion is applied to the nonwoven fabric from above.

The nonwoven fabric in the method of the present invention may comprise thermally already fusioned fibers which are coated with activated carbon particles by means of a binder and are not incipiently melted, and not thermally fusioned, by exerting the pressure and by the temperature. This constitutes a further difference from the method known from WO 2011/133394 A1, wherein the thermal fusioning entails a binding of the activated carbon particles by molten polymer. The method of the present invention thereby prevents a partial enclosing of the particular surface area of the particles by the thermoplastic polymer, and hence a diminishment in the activated carbon particle surface area available for adsorption, substantially at least.

The embossing in WO 2011/133394 A1 is a customary embossing, i.e., the introducing of a relief into a surface. A method wherein the entire surface is brought into a specific shape is not known from this printed publication. The additional layers disclosed in this printed publication, unlike the two or more plies of the nonwoven fabric which are provided according to the present invention, are in a different construction than the nonwoven fabric itself. They do not contain any activated carbon particles and do not contribute to enhancing the adsorptive capacity.

The fibers of the nonwoven fabric may comprise at least one bi-component fiber having a sheath and a core. The core generally has a higher softening temperature than the sheath. The thermoplastic polymer of the present invention may be a polyester or polyester copolymer, in particular a polyester constructed from a multiplicity of identical units. Such a polyester may be present in various forms which differ in the degree of crosslinking and/or a molecular chain length for example. As a result, for example, the bi-component fiber may consist of a single polyester within the meaning of the present invention, in which case the components of the bi-component fiber differ through differing degrees of crosslinking and/or differing molecular chain lengths. The components may have differing melting or softening temperatures as a result.

It transpires that a filter obtained by the method of the present invention is a very capable performer, losing only a little performance capability as a result of an embossing operation associated with the bringing into shape. The nonwoven fabric having the recited specification can take up a comparatively large amount of activated carbon particles, which is another reason why it is a very capable performer. The binder may comprise an acrylate, acrylonitrile-butadiene, acrylate-vinyl acetate, ethylene-vinyl acetate, polyurethane, polyvinyl acetate homopolymer, polyvinylidene chloride, silicone, styrene acrylate and/or styrene butadiene. The acrylate may be, for example, Acronal DS 2373 from BTC Speciality Chemical Distribution, Maarweg 163/165, 50887 Cologne.

In the method of the present invention, the activated carbon particles may become bound by a dispersion of the activated carbon particles and of the binder in a polar solvent, in particular an aqueous solvent, in particular water, being applied to the nonwoven fabric and the nonwoven fabric then being heated to a temperature above the boiling point of the solvent, in particular above 100° C., in particular to a temperature of 120° C. to 150° C. The solvent evaporates as a result, and complete or at least substantially complete crosslinking of binder may take place, so the binder no longer has any or at least no significant binding effect in the subsequent bringing into shape under pressure and temperature and thereby does not contribute to diminishing the surface available for adsorption. Furthermore, the solvent in the activated carbon particles will cause any binder occluding the activated carbon particles to spall open or off as the solvent evaporates.

The dispersion of the activated carbon particles and of the binder in the polar solvent is obtainable by first saturating the activated carbon particles with the solvent by suspending them in the solvent. A dispersion of the binder in the same or some other polar solvent is then admixed to this suspension. The prior saturating of the activated carbon particles with the solvent has the effect of at least substantially preventing the binder penetrating into the activated carbon particles. The binder thus remains essentially on the particle surface. A further effect is that the heating causes the solvent-saturated activated carbon particles to develop on the inside a solvent vapor which spalls open any binder envelope surrounding the particles, so nearly the entire particle surface is available for adsorption after complete evaporation of the solvent. The binder thus only covers a small part of the particular surface area of the activated carbon particles without their adsorptive capacity being diminished to any significant extent.

The filter may be installed such that air flows over it in the engine intake tract of a motor vehicle, in particular of a passenger car. The filter here offers very little resistance to the overflowing air, yet is very efficient in adsorbing volatile hydrocarbons from the air. The bringing into shape via pressure and temperature makes it possible to eschew a mounting frame or a housing to fix the filter, since the filter itself acquires sufficient static stability as result thereof.

The nonwoven fabric in the step of bringing it into shape may be sufficiently densified overall to retain the shape. Alternatively the nonwoven fabric in the step of bringing it into shape may be sufficiently densified in at least one first region to retain the shape and less densified in at least one second region in order thereby to make better adsorption possible in the second region. The resultant one-piece filter has differingly functional regions. The first region maintains the stability of the structure of the filter, while the second region is better at adsorbing than the first region. This does away with the need for two component parts, such as a mounting frame to maintain the stability of the structure and a filter exclusively for adsorption. The manufacture of the filter and also its mounting are appreciably simplified as a result, in particular also because the filter thus obtained is flexible and can even be installed in a difficult-to-access region of an engine intake tract of a motor vehicle and fixed in place there.

Fixing may be effected, for example, using dedicated fastening clips. Alternatively or additionally, at least one hole may be punched into the filter during the production thereof or thereafter using the embossing mold or a punching tool, to fix the filter. It is particularly advantageous when the abovementioned highly densified first region is present to punch the hole in the filter in the first region thereof. The filter may be fixed with a fastening means extending through the hole, for example with a mandrel of a thermoplastic polymer, the tip of which is pressed flat by the action of heat (a heat stake) after passing through the hole. A plurality of such holes may be provided for combining with a plurality of fastening means to provide a good and simple way to fix the filter.

The bringing into shape via pressure and temperature enables exact conforming of the filter to a shape at the place where the filter is ultimately to be localized. So the intake tract does not have to be conformed to the filter, but the filter can be conformed to the intake tract. This plus the elimination of a mounting frame or of a housing results altogether in an appreciable saving with regard to the work and costs involved in producing the filter, mounting the filter and preparing the place envisioned for mounting the filter.

In one embodiment of the method, the temperature at which the nonwoven fabric is brought into the desired shape does not exceed 178° C., in particular does not exceed 170° C., in particular does not exceed 160° C., in particular does not exceed 150° C. The lower the temperature is at which the nonwoven fabric is brought into shape, the less the area is of the activated carbon particles which is enclosed/covered by softening polymer and the lower the air resistance is which the nonwoven fabric offers to overflowing air. However, the temperature has to be sufficient to soften at least one polymer in the nonwoven fabric such that the nonwoven fabric may thereby be brought into the desired shape in an effective manner.

The pressure and temperature may be exerted for at least 35 seconds, in particular at least 45 seconds, in particular at least 60 seconds, in particular at least 90 seconds, in particular at least 4 minutes.

The polymer may be a polymer having a melting point or melting range between 200° C. and 265° C., in particular between 225° C. and 250° C., in particular between 230° C. to 245° C. The softening temperature of such a polymer may be up to 60 K below the temperature of the melting point.

The core of the bi-component fiber may consist of, for example, of polypropylene, poly(4-methyl-1-pentene), polyester, polyethylene terephthalate (=PET), polybutylene terephthalate or poly(1,4-cyclohexylene dimethylene terephthalate) or copolymers or mixtures of the preceding polymers or polyamide. The sheath component may consist of polyester, polyethylene, polybutene, polypropylene or copolymers or mixtures of the preceding polymers or polyamide. The polyethylene may be low pressure polyethylene or high pressure polyethylene, in particular linear high pressure polyethylene. In one embodiment of the method according to the present invention, it is possible for the core to consist of polyester and the sheath of polyester copolymer, the core to consist of polyester and the sheath of polyamide or the core to consist of polypropylene and the sheath of polyethylene.

In a further embodiment of the method, the core and the sheath of the bi-component fiber consist of polyester or polyester copolymer, wherein the core consists of a polyester or polyester copolymer having a higher softening temperature than the sheath. The core may consist of a polyester having a softening temperature above 190° C. and the sheath may consist of a polyester having a softening temperature between 140° C. and 160° C., in particular between 145° C. and 155° C. The polyester may comprise polyethylene terephthalate (PET).

The fraction of the fibers which is attributable to the bi-component fiber may be 10 wt % to 70 wt %, in particular 20 wt % to 60 wt %, in particular 40 wt % to 50 wt %.

The nonwoven fabric may be one-sidedly or two-sidedly embossed by the embossing mold. For two-sided embossing, the nonwoven fabric may be heated by the embossing mold from two opposite sides. This makes it possible to produce a surface embossed on both sides of the nonwoven fabric.

The nonwoven fabric used for the method of the present invention may be the thermally consolidated polyester felt sold by helsatech GmbH under article number VL000433.

The invention further relates to a filter for adsorbing volatile hydrocarbons from a plurality of plies of a nonwoven fabric, wherein the nonwoven fabric comprises thermally fusionable fibers, wherein a binder binds activated carbon particles to the surface of the fibers. The fibers consist of at least one thermoplastic polymer having a melting point or melting range above 200° C. The plurality of plies of the nonwoven fabric are brought into a shape by exertion of pressure and a temperature below 190° C., wherein the nonwoven fabric is sufficiently densified overall or in at least one region for the shape to be maintained as a result. The filter may be a filter obtained by the method according to the present invention.

Figure 2:
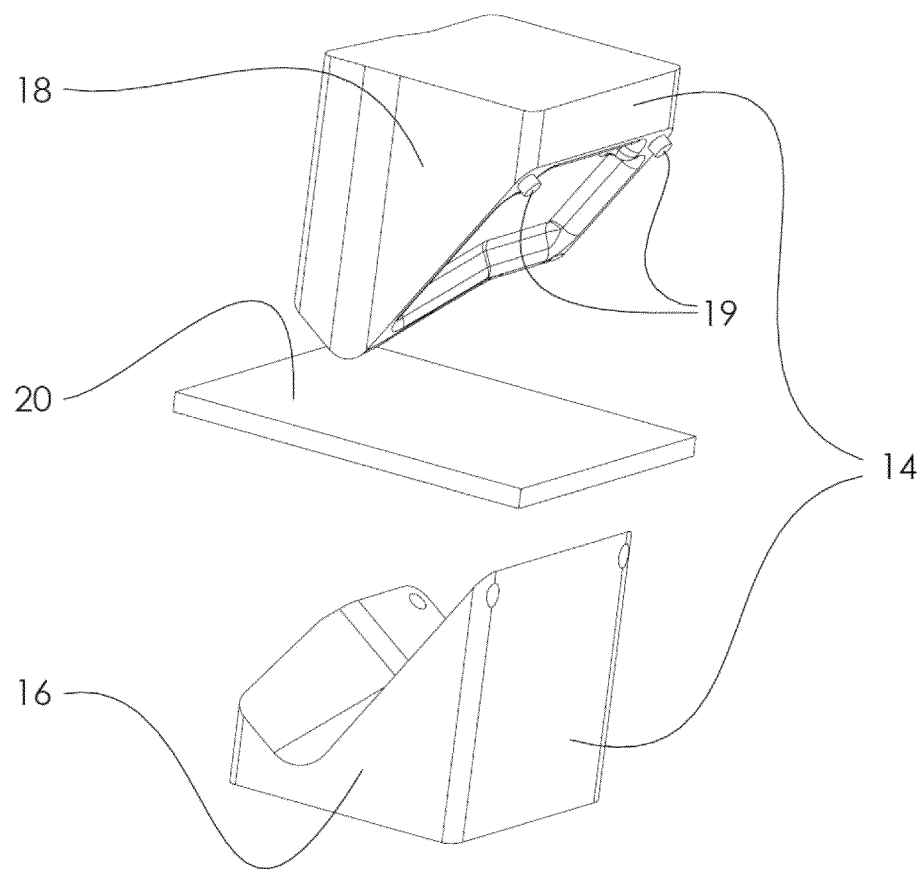
Figure 3:
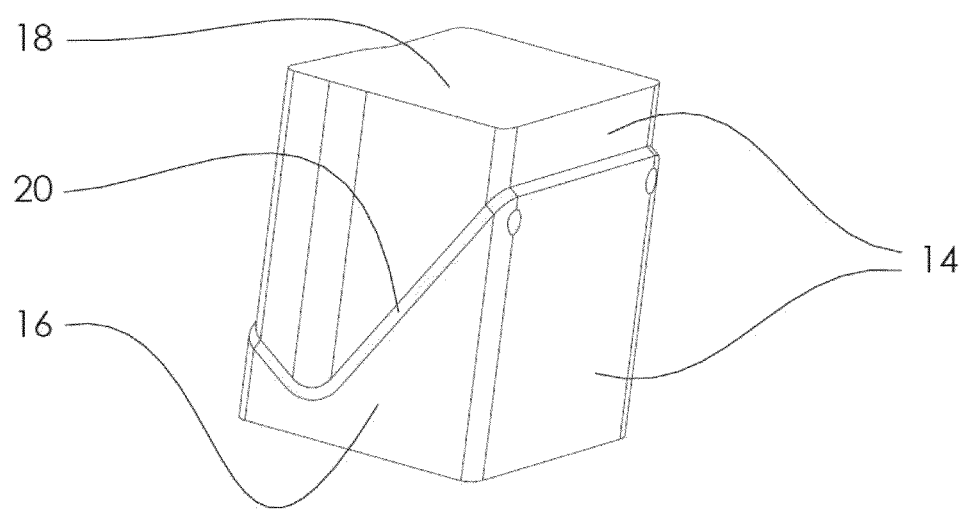
Figure 4:
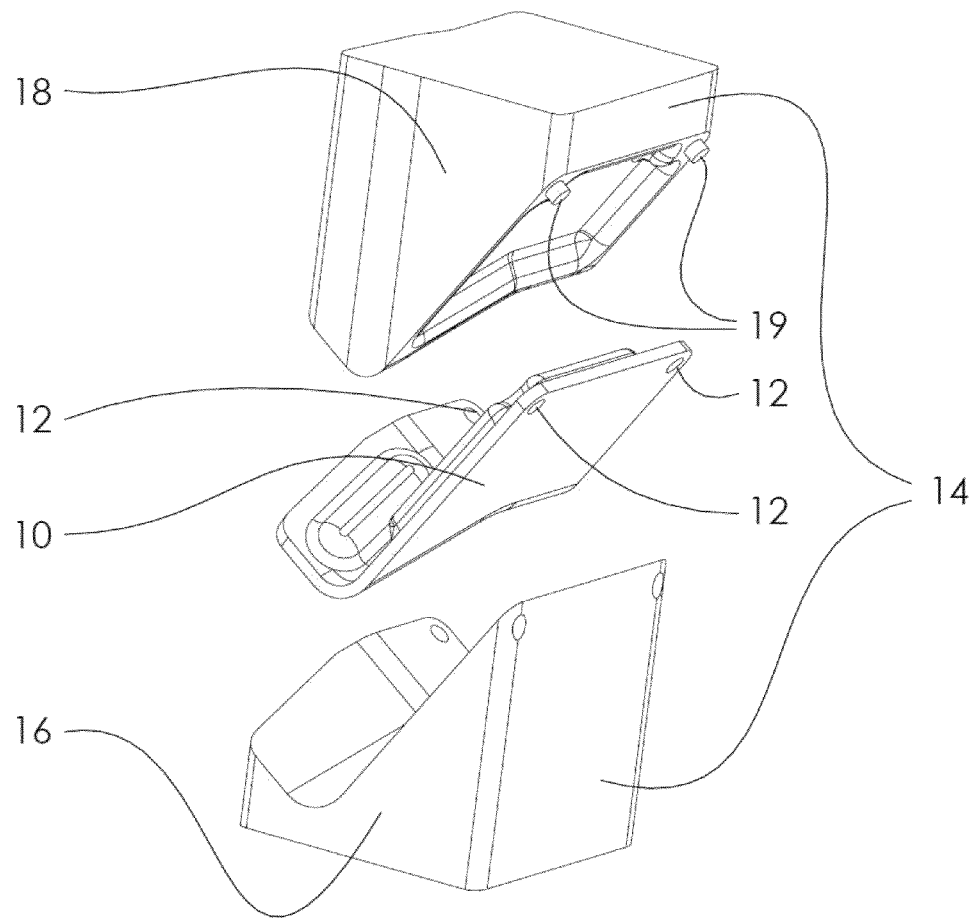
Figure 5:
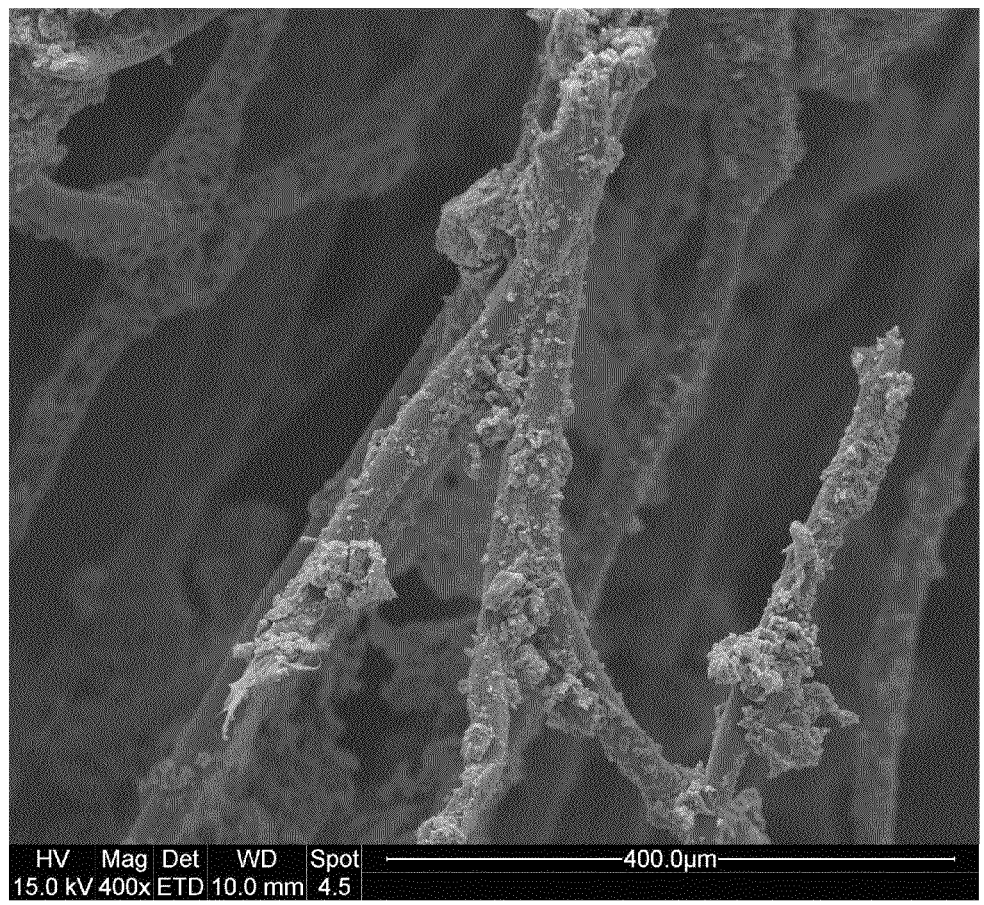
Figure 6:
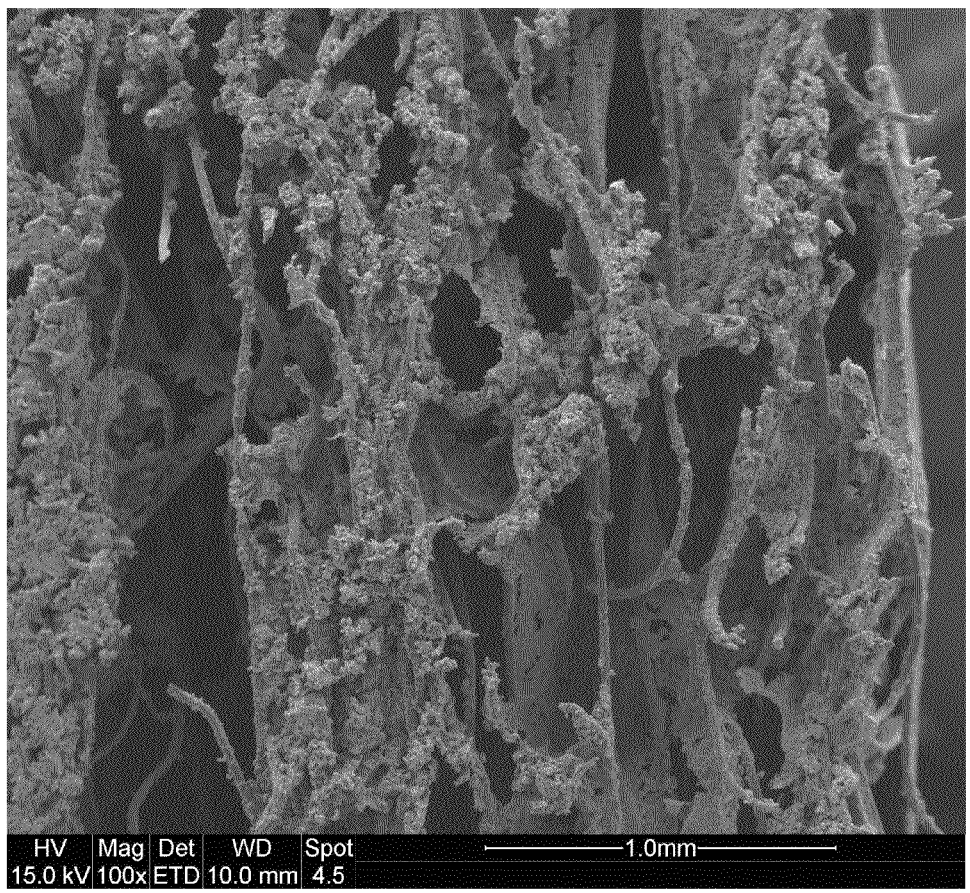
Figure 7:
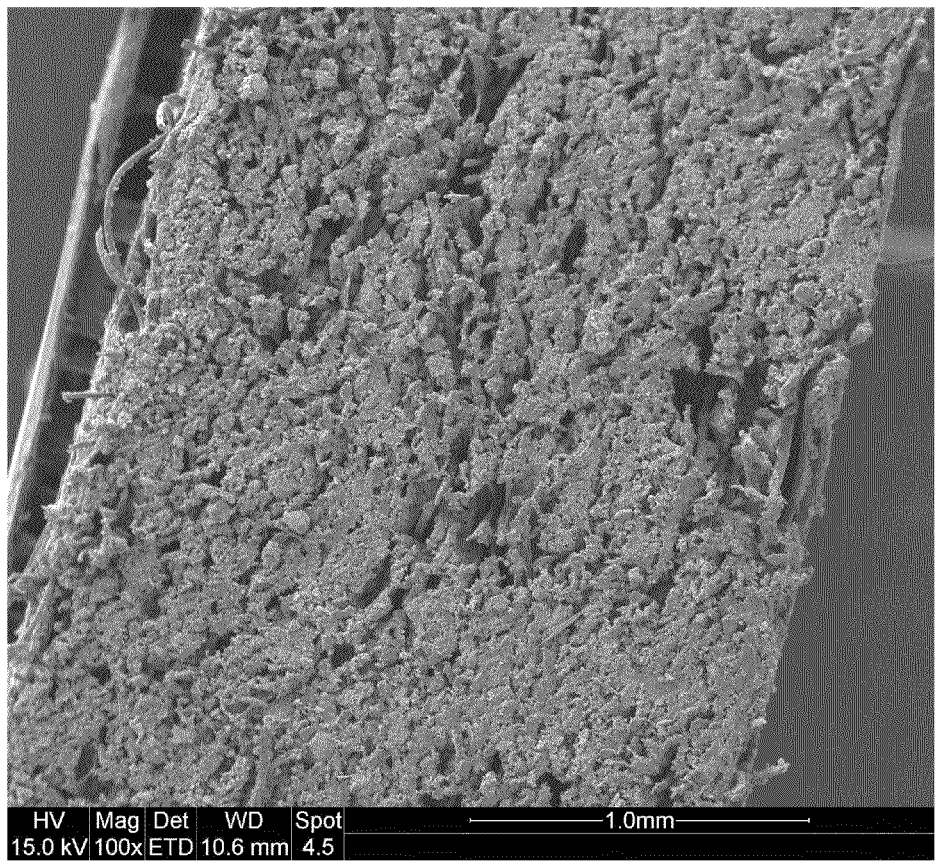

The invention will now be more particularly elucidated with reference to an exemplary embodiment and the drawings, where FIG. 1 shows a filter according to the present invention, FIG. 2 to FIG. 4 show individual steps of the method for producing this filter, FIG. 5 shows a scanning electron micrograph of a nonwoven fabric consisting exclusively of polyester, after binding the activated carbon particles with an acrylate binder, FIG. 6 shows a scanning electron micrograph of the nonwoven fabric depicted in FIG. 5, in lower magnification, and FIG. 7 shows a scanning electron micrograph of the nonwoven fabric depicted in FIGS. 5 and 6, after bringing the nonwoven fabric into shape by exertion of pressure and temperature.

FIG. 1 shows the filter 10 of the present invention with three holes 12 punched by a punching tool. These holes 12 make it possible to secure the filter 10 at the desired place, for example via bolts, rivets or so-called heat stakes. The filter has a first region 22 where the densification of the nonwoven fabric 20 is sufficient for the three-dimensional shape to be preserved as a result. The first region 22 thereby performs a structure stabilizing function. It is also in the first region 22 where the holes 12 have been punched. The densification of the nonwoven fabric 20 is less in a second region 24. The nonwoven fabric 20 thereby makes possible better penetration by gas flowing over the filter and also better adsorption of hydrocarbons from this gas.

FIG. 2 shows a hot embossing mold 14 consisting of a bottom die 16 and a top die 18. The top die 18 functions as punching tool and has pins 19 for punching out the holes 12. A flat nonwoven fabric 20 has been introduced between the bottom die 16 and a top die 18. FIG. 3 shows the hot embossing mold 14 in the closed state with the nonwoven fabric 20 clamped in between the bottom die 16 and the top die 18. Bottom die 16 and top die 18 combine to exert pressure and heat on the nonwoven fabric 20 arranged therebetween. After about one minute, the top die 18 is raised (FIG. 4). The filter 10 formed out of the nonwoven fabric 20 with the holes 12 punched by the embossing mold 14 can subsequently be removed from the embossing mold 14.

After binding the activated carbon particles with the binder, the nonwoven fabric 20 depicted in FIGS. 5 and 6 was heated to a temperature of 190° C. and cooled back down. It is clearly evident from FIG. 5 in particular that the particles are all sitting on the surface of the fibers and that the surface of the fiber has not melted at 190° C. and that the particles have not been partially melted into the surface. The surface area of the activated carbon particles which is available for adsorption is not diminished here as a result of such melting into the fiber surface.

FIG. 7 shows two plies of the nonwoven fabric 20 depicted in FIGS. 5 and 6 after they have been bonded together, and brought into a desired shape, by means of an embossing mold 14 by exertion of pressure and by a temperature of 190° C. It is clearly evident therefrom that even after such densifying there is an open structure whereinto gas can penetrate, so volatile hydrocarbons can be adsorbed therefrom by the activated carbon particles.

LIST OF REFERENCE SIGNS 10 filter
12 hole 14 embossing mold
16 bottom die
18 top die
19 pin
20 nonwoven fabric
22 first region
24 second region

The invention claimed is:

1. A method of producing a filter for adsorbing volatile hydrocarbons from a nonwoven fabric, wherein the nonwoven fabric comprises thermally fusionable fibers, wherein a binder is used to bind activated carbon particles to the surface of the fibers, wherein the fibers consist of at least one thermoplastic polymer having a melting point or melting range above 200° C., wherein the nonwoven fabric is brought into a desired shape using an embossing mold by exertion of pressure and by a temperature of at most 190° C., wherein a plurality of plies of the nonwoven fabric are bonded together by the exertion of the pressure and by the temperature, wherein the nonwoven fabric in the step of bringing it into shape is sufficiently densified in at least one first region to retain the shape and less densified in at least one second region in order thereby to make better adsorption possible in the second region.

2. The method as claimed in claim 1, wherein the nonwoven fabric comprises thermally fusioned fibers.

3. The method as claimed in claim 1, wherein the fibers comprise at least one bi-component fiber having a sheath and a core.

4. The method as claimed in claim 1, wherein the temperature does not exceed 178° C.

5. The method as claimed in claim 1, wherein the pressure and temperature are exerted for at least 35 seconds.

6. The method as claimed in claim 1, wherein the polymer is a polymer having a melting point or melting range between 200° C. and 265° C.

7. The method as claimed in claim 1, wherein the thermoplastic polymer is a polyester.

8. The method as claimed in claim 3, wherein the core and the sheath of the bi-component fiber consist of polyester or polyester copolymer, wherein the core consists of a polyester or polyester copolymer having a higher softening temperature than the sheath.

9. The method as claimed in claim 8, wherein the core consists of a polyester having a softening temperature above 190° C. and the sheath consists of a polyester having a softening temperature between 140° C. and 160° C.

10. The method as claimed in claim 7, wherein the polyester comprises polyethylene terephthalate (PET).

11. The method as claimed in claim 3, wherein the fraction of the fibers which is attributable to the bi-component fiber is 10 wt % to 70 wt %.

12. The method as claimed in claim 1, wherein the binder comprises an acrylate, acrylonitrile-butadiene, acrylate-vinyl acetate, ethylene-vinyl acetate, polyurethane, polyvinyl acetate homopolymer, polyvinylidene chloride, silicone, styrene acrylate and/or styrene butadiene.

13. The method as claimed in claim 1, wherein the activated carbon particles are bound by a dispersion of the activated carbon particles and of the binder in a polar solvent being applied to the nonwoven fabric and the nonwoven fabric then being heated to a temperature above the boiling point of the solvent.

14. The method as claimed in claim 1, wherein the nonwoven fabric is one-sidedly or two-sidedly embossed by the embossing mold.

15. The method as claimed in claim 1, wherein at least one hole for fixing the filter is punched into the filter by means of a punching tool or the embossing mold.

16. The method as claimed in claim 1, wherein the pressure and temperature are exerted for at least 45 seconds.

17. The method as claimed in claim 1, wherein the pressure and temperature are exerted for at least 60 seconds.

18. The method as claimed in claim 1, wherein the pressure and temperature are exerted for at least 90 seconds.

19. The method as claimed in claim 1, wherein the pressure and temperature are exerted for at least 4 minutes.

20. A filter for adsorbing volatile hydrocarbons from a plurality of plies of a nonwoven fabric, wherein the nonwoven fabric comprises thermally fusionable fibers, wherein a binder binds activated carbon particles to the surface of the fibers, wherein the fibers consist of at least one thermoplastic polymer having a melting point or melting range above 200° C., wherein the plurality of plies of the nonwoven fabric are brought into a shape by exertion of pressure and a temperature of at most 190° C., wherein the nonwoven fabric is sufficiently densified in at least one first region for the shape to be maintained as a result and less densified in at least one second region in order thereby to make better adsorption possible in the second region;

wherein the filter is obtained by a method of producing a filter for adsorbing volatile hydrocarbons from a nonwoven fabric, wherein the nonwoven fabric comprises thermally fusionable fibers, wherein a binder is used to bind activated carbon particles to the surface of the fibers, wherein the fibers consist of at least one thermoplastic polymer having a melting point or melting range above 200° C., wherein the nonwoven fabric is brought into a desired shape using an embossing mold by exertion of pressure and by a temperature of at most 190° C., wherein a plurality of plies of the nonwoven fabric are bonded together by the exertion of the pressure and by the temperature, wherein the nonwoven fabric in the step of bringing it into shape is sufficiently densified in at least one first region to retain the shape and less densified in at least one second region in order thereby to make better adsorption possible in the second region.

* * * * *